(12) United States Patent
Taylor et al.

(10) Patent No.: US 6,880,333 B1
(45) Date of Patent: Apr. 19, 2005

(54) CONTROL ASSEMBLY FOR A HYDRAULIC DEVICE

(75) Inventors: Michael W. Taylor, Sullivan, IL (US); Herb Poplawski, Racine, WI (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 66 days.

(21) Appl. No.: 10/444,753

(22) Filed: May 23, 2003

(51) Int. Cl.$^7$ .............................................. F16D 31/02
(52) U.S. Cl. ......................................... 60/436; 60/442
(58) Field of Search ................ 60/436, 442; 74/473.19, 74/473.21, 473.26

(56) References Cited

U.S. PATENT DOCUMENTS

| | | | | |
|---|---|---|---|---|
| 3,517,790 A | * | 6/1970 | Damon | 60/436 |
| 3,741,356 A | * | 6/1973 | Sieren et al. | 74/473.19 |
| 3,777,585 A | * | 12/1973 | Plamper | 474/27 |
| 3,923,129 A | * | 12/1975 | Rusch et al. | 60/436 |
| 4,176,560 A | * | 12/1979 | Clarke | 474/27 |
| 4,698,048 A | * | 10/1987 | Rundle | 74/473.19 |
| 5,040,649 A | | 8/1991 | Okada | |
| 5,094,077 A | | 3/1992 | Okada | |
| 5,203,169 A | | 4/1993 | Ishii et al. | |
| 5,211,070 A | * | 5/1993 | Hirata et al. | 74/473.21 |
| 5,314,387 A | | 5/1994 | Hauser et al. | |
| 5,394,669 A | | 3/1995 | Hallett et al. | |
| 5,440,951 A | | 8/1995 | Okada et al. | |
| 6,374,604 B1 | | 4/2002 | Poplawski et al. | |
| 6,446,521 B1 | * | 9/2002 | Hama et al. | 74/473.19 |
| 6,651,427 B1 | * | 11/2003 | Poplawski et al. | 60/436 |
| 6,715,284 B1 | * | 4/2004 | Poplawski et al. | 92/12.2 |

* cited by examiner

*Primary Examiner*—Edward K. Look
*Assistant Examiner*—Michael Leslie
(74) *Attorney, Agent, or Firm*—Neal, Gerber & Eisenberg, LLP

(57) ABSTRACT

A control system for a vehicle having a hydraulic drive device such as a hydrostatic transmission or integrated hydrostatic transaxle with a return to neutral feature and a brake mechanism. The system includes a pair of linkages connected to the vehicle brake pedal; one is engaged to the return to neutral arm and the other is engaged to the brake of the drive device, so that actuation of the vehicle brake pedal first causes the return to neutral feature of the drive device to engage to reduce vehicle speed and eventually to return the device to the neutral position. As the vehicle brake pedal is further actuated, the brake mechanism of the drive device is also engaged.

8 Claims, 6 Drawing Sheets

CONTROL ASSEMBLY FOR A HYDRAULIC DEVICE

BACKGROUND OF THE INVENTION

This invention relates generally to hydrostatic transmissions and, more particularly, to a return to neutral and brake assembly for use in connection with a hydrostatic transmission.

Hydrostatic transmissions ("HSTs"), including integrated hydrostatic transmissions ("IHTs"), are well known in the art and are more fully described in, among others, U.S. Pat. No. 5,314,387, which is incorporated herein by reference in its entirety. Generally, an HST includes a center section or the like on which is mounted a hydraulic pump and a hydraulic motor. The hydraulic pump and the hydraulic motor each carry a plurality of reciprocating pistons that are in fluid communication through porting formed in the center section. As the hydraulic pump rotates, the pump pistons move axially as they bear against an adjustable swash plate where the angular orientation of the swash plate affects the degree of axial movement of the pump pistons.

The movement of the pump pistons forces a hydraulic fluid through the porting to the motor pistons, which causes the motor pistons to be forced against a thrust bearing to thereby rotate the hydraulic motor. As the hydraulic motor rotates, hydraulic fluid is returned to the hydraulic pump through the porting. In this manner, the rotation of the hydraulic pump is translated to the hydraulic motor to drive one or more axles of a riding lawn mower, small tractor, or the like.

It is also known to use external linkages to control the output of such a transmission or transaxle and to provide braking of the unit. Such linkages are generally connected to hand or foot controls on a vehicle.

SUMMARY OF THE INVENTION

This invention provides an improved braking and return to neutral mechanism for a hydraulic apparatus such as an integrated hydrostatic transmission. The device enables the user to actuate the return to neutral feature of the transmission by means of actuating the brake pedal, where the return to neutral is actuated before the brake is actuated. This provides for smoother stopping of the vehicle and permits the brake to be used as a parking brake instead of a dynamic brake. The disclosed invention also permits the user to decelerate the vehicle by using the brake pedal to engage the return to neutral feature without engaging the brake.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
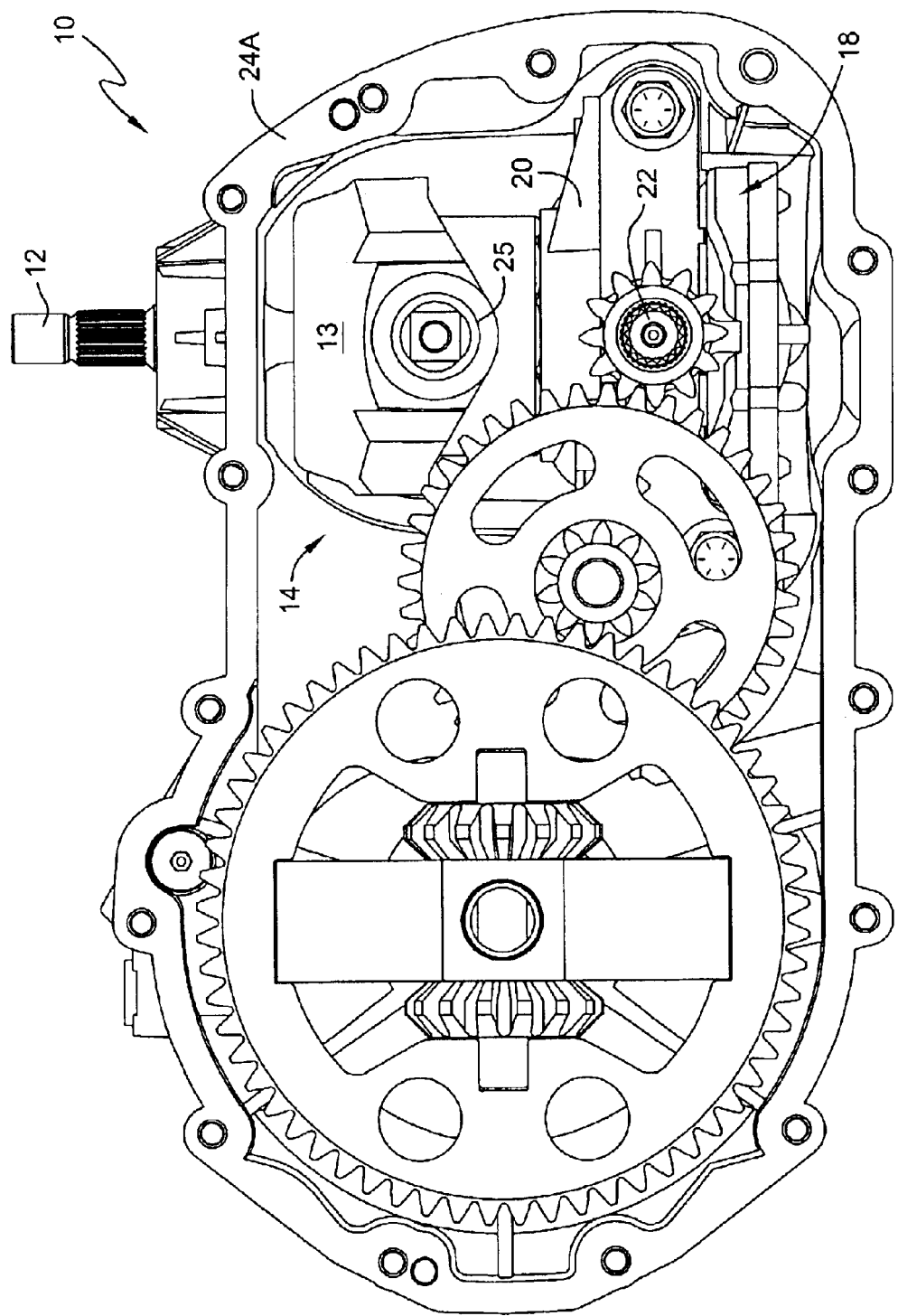
FIG. 1 illustrates an internal view of an exemplary embodiment of a hydrostatic transmission.
Figure 2:
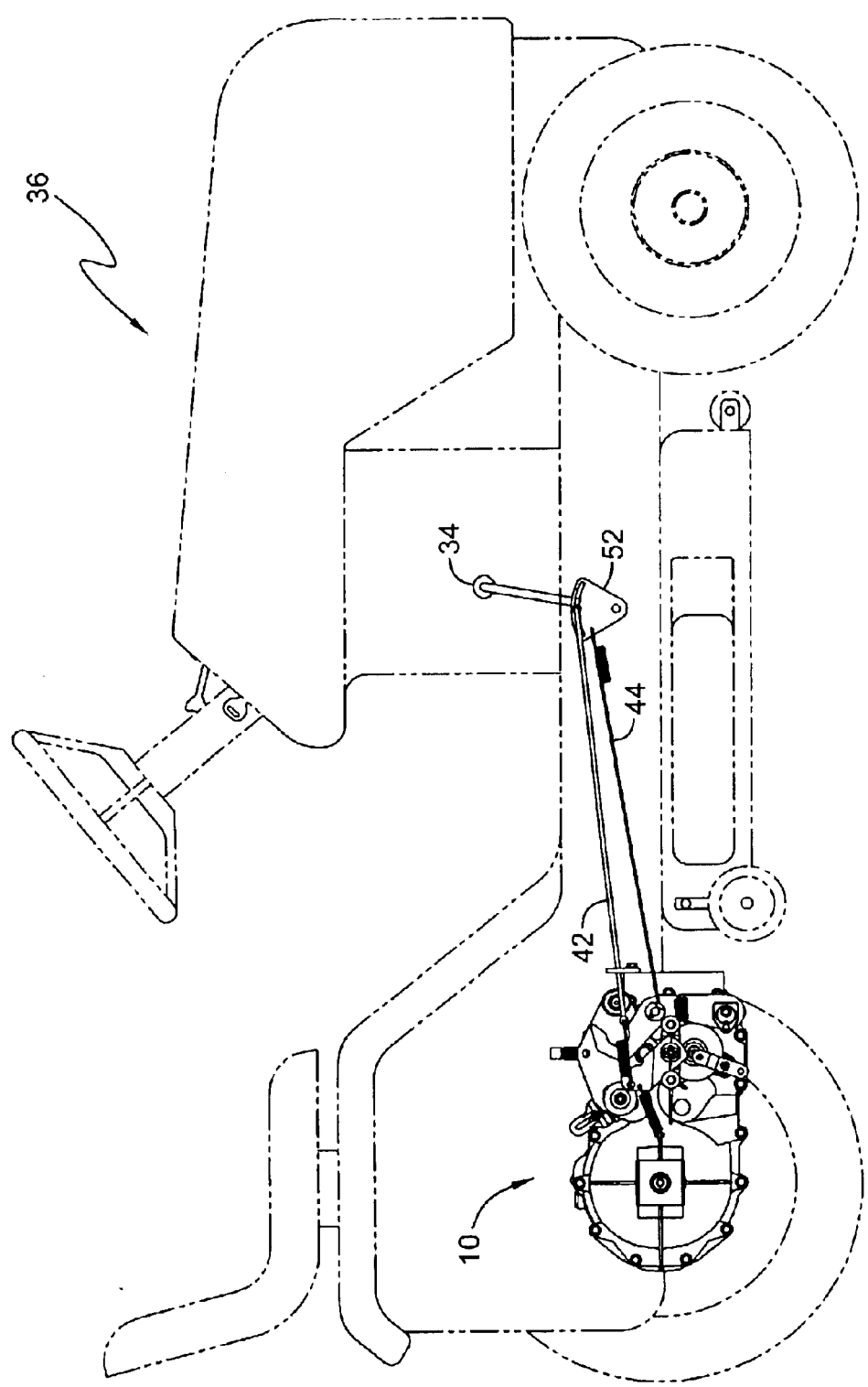
FIG. 2 is a side elevational view of the transmission and control assembly of the present invention shown as it would be mounted in a vehicle such as a lawn tractor.
Figure 3:
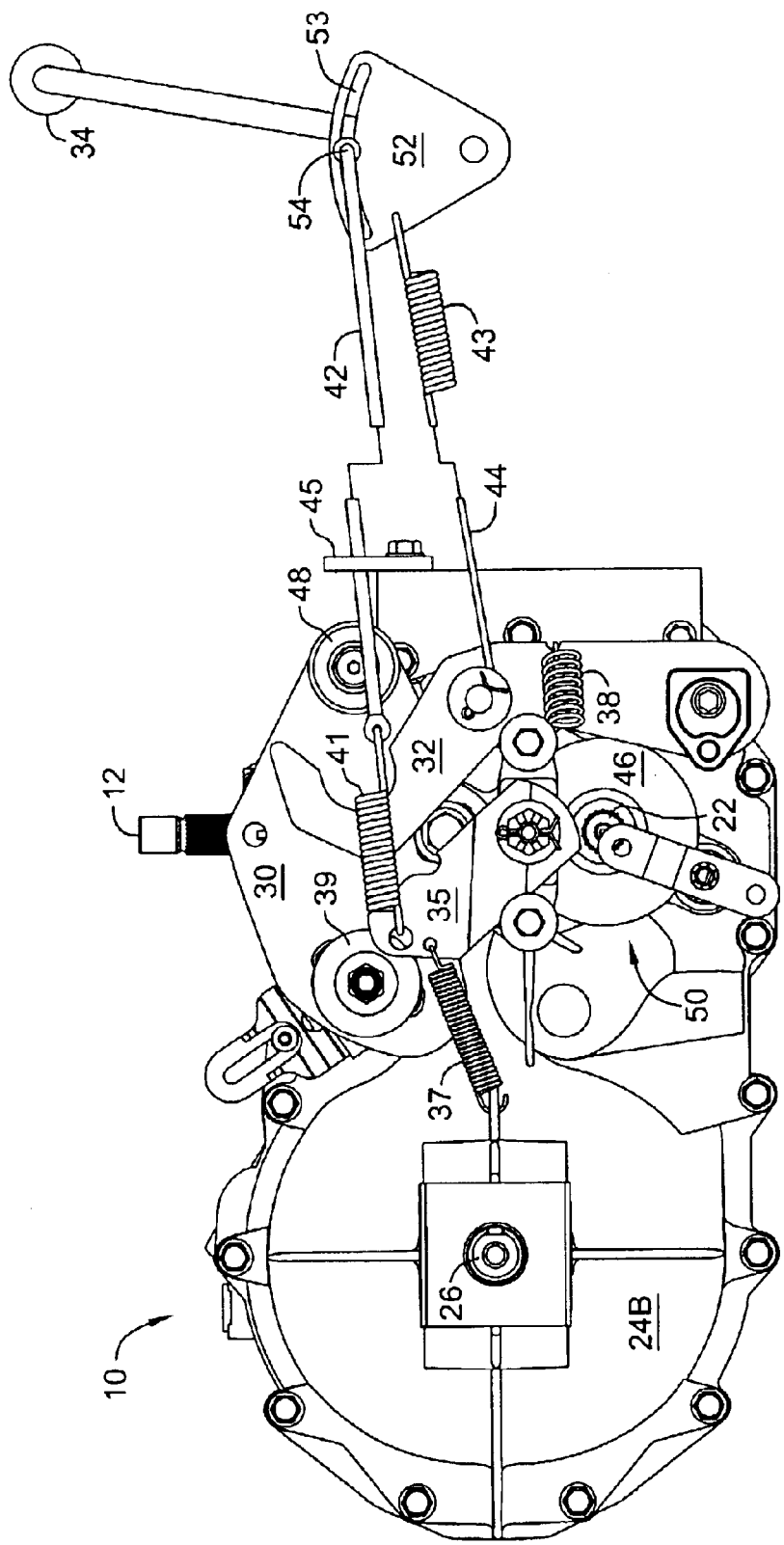
FIG. 3 is a side elevational view of the transmission and control assembly of FIG. 2.

Turning now to the figures, wherein like reference numerals refer to like elements, there is illustrated in FIG. 1 an exemplary hydrostatic transmission in the form of an IHT 10. FIG. 2 shows an exemplary vehicle 36 on which IHT 10 has been mounted. As will be understood by those of skill in the art, IHT 10 generally operates on the principle of an input shaft 12 rotatably driving a hydraulic pump 14 which, through the action of its pump pistons, pushes hydraulic fluid to a hydraulic motor (not shown) through porting formed in a center section 20 to cause the rotation of the hydraulic motor (not shown). The rotation of the hydraulic motor causes the rotation of a motor shaft 22 which rotation is eventually transferred through a gearing system or the like to drive one axle shaft (in the case of a zero-turn hydrostatic transaxle) or a pair of axle shafts 26 (as would be used in the vehicle illustrated in FIG. 2). A motive force from, for example, an engine may be supplied directly to the input shaft 12 or indirectly by means of a pulley to drive hydraulic pump 14. For a more detailed description of the principles of operation of such a hydrostatic transmission and its related external controls, the reader is referred to U.S. Pat. Nos. 5,314,387; 5,613,409 and 6,253,637, all of which are incorporated herein by reference in their entirety.

The IHT 10 is provided with a housing or casing that, in the illustrated example, comprises a first side housing section 24A and a second side housing section 24B that are joined along a substantially vertical junction surface. Extending from the top of housing 24A is an input shaft 12. Meanwhile, axle shafts 26 in the illustrated example extend from both the first side housing section 24A and second side housing section 24B. Thus, in the illustrated, exemplary IHT 10, the axis of axle shafts 26 would be generally perpendicular to the substantially vertical junction surface. Similarly, in the illustrated embodiment, the plane of the pump running surface of center section 20 is generally perpendicular to the substantially vertical junction surface while the plane of the motor running surface of center section 20 is generally parallel to the substantially vertical junction surface. The axis of motor shaft 22 would be generally parallel to the axis of axle shafts 26 and perpendicular to the axis of input shaft 12. It is to be understood, however, that this arrangement is merely illustrative and that the housing and/or IHT operating components can be otherwise arranged without departing from the scope of this invention.

For placing hydraulic pump 14 in fluid communication with the hydraulic motor, center section 20 includes hydraulic porting. The hydraulic porting is in further fluid communication with a source of makeup fluid, such as a fluid sump or a charge gallery. Generally, the hydraulic porting comprises a high pressure side through which fluid moves from hydraulic pump 14 to the hydraulic motor and a low pressure side through which fluid returns from the hydraulic motor to hydraulic pump 14. A filter assembly 18 may be positioned adjacent center section 20, intermediate the sump and the hydraulic porting, to minimize the introduction of impurities, such as metal shavings, into the hydraulic circuit when makeup fluid is drawn into the hydraulic circuit.

To adjust the amount of oil that is forced from hydraulic pump 14 to the hydraulic motor via the high pressure side hydraulic porting, IHT 10 includes a moveable swash plate 13 against which the pump pistons travel. The direction of rotation of hydraulic pump 14 is fixed by the rotation of input shaft 12 and, as such, hydraulic pump 14 is nearly always rotated in one direction. As will be understood by those of ordinary skill in the art, swash plate 13 may be moved to a variety of positions to vary the stroke of the pump pistons and the direction of rotation of the hydraulic motor. Generally, as the angular orientation of the swash plate 13 is varied in one direction from the neutral position the axial displacement or stroke of the pump pistons is varied, which then drives the hydraulic motor in a direction determined by the hydraulic porting at a speed that is related to the volume of the fluid displaced by the pump pistons taking into consideration the efficiency of the system. In the neutral position, swash plate 13 does not function to axially displace the pump pistons.

Rotation of the hydraulic motor results from the motor pistons moving against a thrust bearing under the influence of the hydraulic fluid. As the angular orientation of swash plate 13 is decreased to pass through the neutral position, the direction of rotation of the hydraulic motor is reversed and the speed of the hydraulic motor is again influenced by the volume of fluid displaced by the pump pistons. Since the speed of rotation of the hydraulic motor is dependent upon the amount of hydraulic fluid pumped thereinto by hydraulic pump 14 and the direction of rotation of the hydraulic motor is dependent upon the angular orientation of the swash plate 13, the angular orientation of swash plate 13 is seen to control the speed and direction of rotation of the hydraulic motor and, as will be apparent, the speed and direction of rotation of the axle shaft(s) 26.

For changing the angular orientation of swash plate 13, a trunnion arm 25 is rotatably supported in housing 24B of IHT 10. Rotation of trunnion arm 25 changes the angular orientation of swash plate 13 with respect to the pump pistons. To rotate trunnion arm 25 and, accordingly, move swash plate 13, a control arm 30 is coupled to trunnion arm 25. Control arm 30 may be connected to a lever, pedal, etc. (not shown) provided on a vehicle 36 whereby movement of the lever or pedal is translated to control arm 30 to cause the rotation of trunnion arm 25 and movement of swash plate 13.

In the embodiment depicted, brake mechanism 50 comprises a brake disk 46 mounted on motor output shaft 22. Brake disk 46 is actuated by means of brake arm 35 which is maintained in, and returned to its disengaged position by means of return spring 37 which is mounted between brake arm 35 and housing 24B. Brake pedal 34 is mounted on vehicle 36 and engages brake pedal control arm 52. Brake arm linkage 42 and return arm linkage 44 connect brake pedal control arm 52 to IHT 10. Specifically, one end of brake arm linkage 42 is engaged to slot 53 in brake pedal control arm 52 by means of a pin 54. Pin 54 would most likely be a bent portion of return arm linkage secured to slot 53 by means of a cotter pin or the like. The interaction of pin 54 and slot 53 permits brake pedal control arm 52 to travel for a selected distance without the system engaging the brake arm. The other end of brake arm linkage 42 is connected to one end of a spring 41, which is connected at its other end to brake arm 35. Bracket 45 is mounted to housing 24B and used to provide additional support to brake arm linkage 42.

The rotation of trunnion arm 25, and thus the position of swash plate 13 is controlled externally by means of control arm 30. A friction pack 39 is used to maintain control arm 30 in a selected position to act as a cruise control mechanism. Return arm 32 is also mounted on housing 24B and it interacts with ball bearing and bearing cap assembly 48 and return arm spring 38 to return the control arm 30 to a neutral position. The term neutral position is generally used herein to denote the position where swash plate 13 is generally perpendicular to the pistons of pump 14, so that there is no output of IHT 10 and hence no movement of vehicle 36. It will be understood by those of skill in the art, however, that the location of neutral may not be exact and the precision required in establishing neutral will depend on the application. In many applications there is a neutral band instead of a specific neutral point, and other features may be used to create the neutral position. Thus this term should not be read narrowly as only one specific point.

Figure 4:
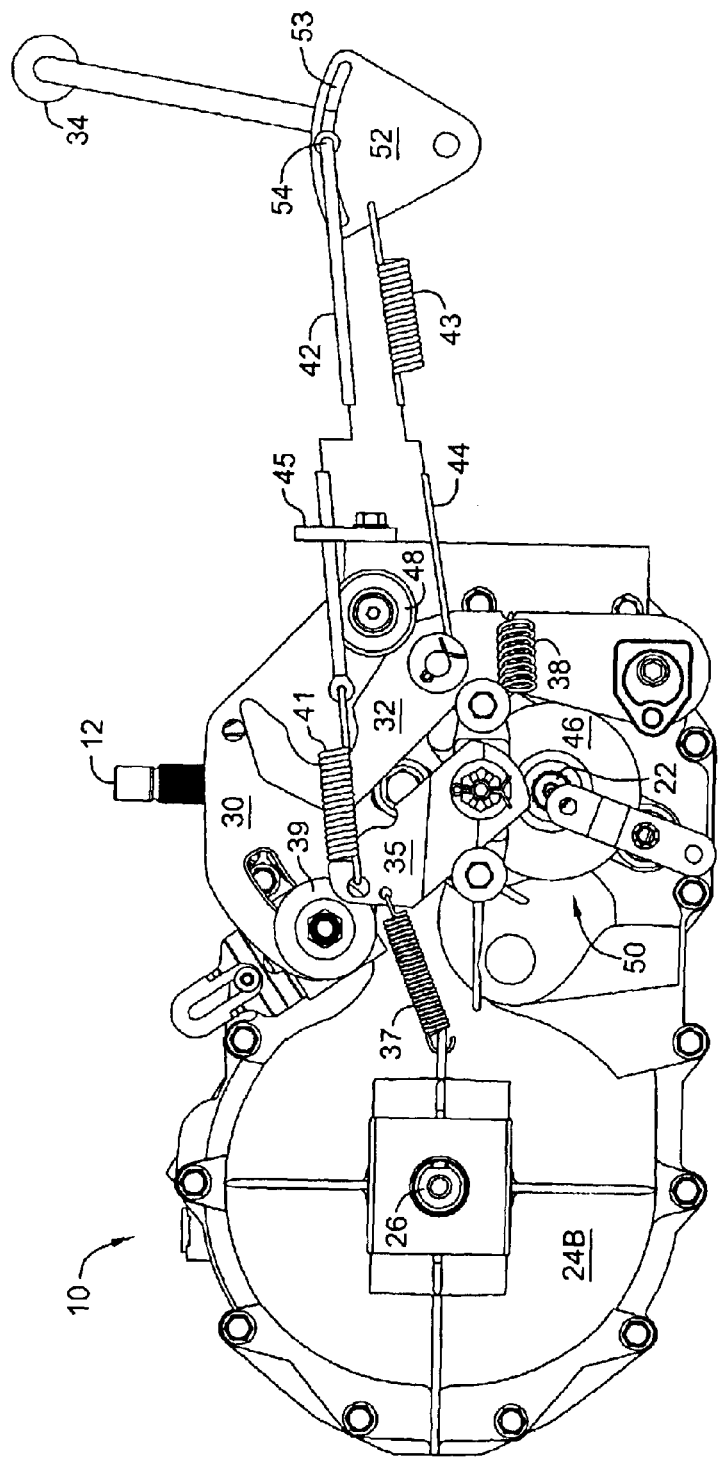
FIG. 4 is a side elevational view of the transmission and control assembly of FIG. 2, with the control arm in the forward direction.
Figure 5:
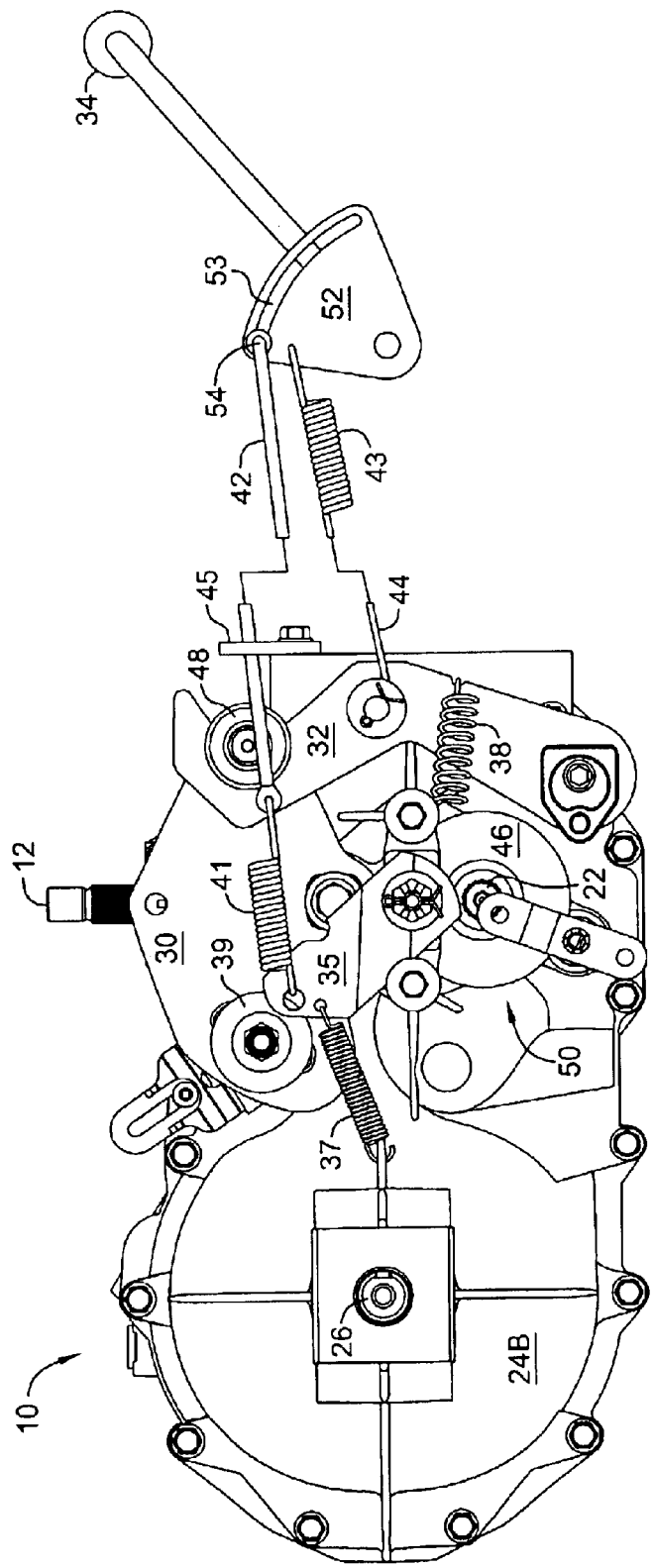
FIG. 5 is a side elevational external view of the transmission and control assembly of FIG. 2, where the return arm linkage has pulled the return arm into the neutral position.
Figure 6:
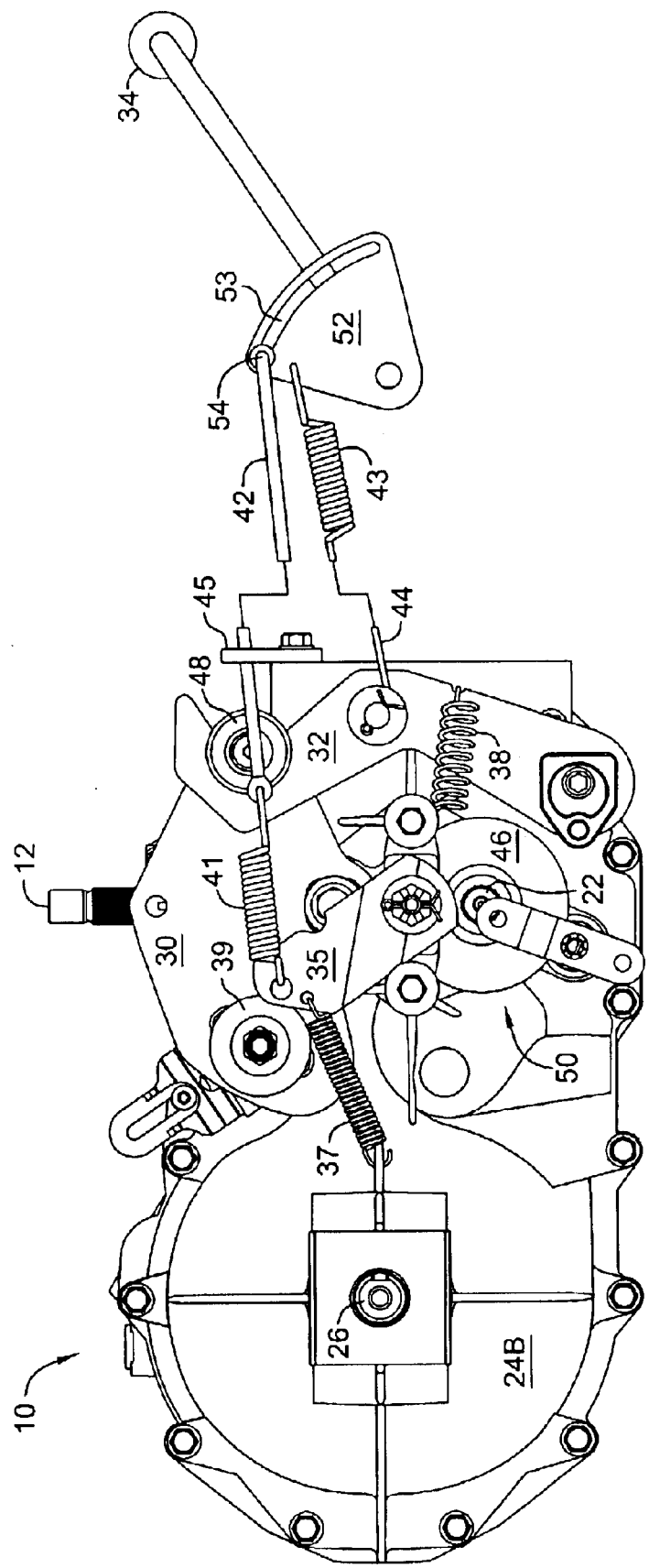
FIG. 6 is a side elevational external view of the transmission and control assembly of FIG. 2, where the brake arm linkage has reached the end of its travel and is actuating the brake arm.

The operation of this invention is best understood by a comparison of FIGS. 4–6. In these figures, the linkages 42 and 44 are shown in broken line format to better show the relationships of the elements. In FIG. 4, brake pedal control arm 52 is shown in the first, disengaged position, i.e., where the brake pedal 34 has not been depressed, and control arm 30 is in the full forward position. While this view shows control arm 30 in the full forward position, it will be understood that this design works in the same manner when control arm 30 is in any non-neutral position. Control arm 30 is preferably controlled by a hand control apparatus (not shown) on vehicle 36.

FIG. 5 shows that brake pedal control arm 52 has been moved forward to a second position, where return arm linkage 44 has been pulled forward and has moved return arm 32 forward, thereby moving control arm 30 to the neutral position. In the movement of brake pedal control arm 52 between the first position shown in FIG. 4 and the second position shown in FIG. 5, pin 54 has traveled through slot 53, thus allowing brake arm linkage 42 to move relative to brake pedal control arm 52, so that brake arm 35 is not yet engaged. Thus, the actuation of brake pedal 34 first acts to return control arm 30 to neutral before brake assembly 50 is first engaged.

This design minimizes the tolerance concerns inherent in designing a transmission and linkages for different vehicle applications. FIG. 6 shows brake pedal control arm 52 in a third position; i.e., where the brake pedal 34 has been depressed further beyond the position shown in FIG. 5. After return arm 32 reaches the limit of its travel, pedal control arm 52 may still be moved forward with respect thereto, and spring 43 extends further to permit this continued movement.

As pedal control arm 52 continues to move forward, it also provides increasing tension on brake arm linkage 42. Brake mechanism 50 is preferably a cam-type brake, where rotation of brake arm 35 increases the force on brake disk 46 through a cam (not shown). Brake arm linkage spring 41 is used to permit continued forward travel of brake arm linkage 42 after brake arm 35 has reached the limit of its travel. Similarly, spring 43 permits additional forward travel of pedal control arm 52 after control arm 30 has reached its stop position. Thus, these linkages can be used with different vehicle configurations without significant modifications.

This design further provides the user the ability to engage the return to neutral feature of the transmission to decrease the speed of the vehicle without actually engaging brake mechanism 50 and without operating the vehicle speed control. As shown above, if brake pedal 34 is partially engaged, the return to neutral feature is engaged since return arm 32 and control arm 30 are moved, but brake arm 35 is not yet engaged, thus providing deceleration without braking. This gives the user increased control over vehicle speed.

While specific embodiments of the invention have been described in detail, it will be appreciated by those skilled in the art that various modifications and alternatives to those details could be developed in light of the overall teachings of the disclosure. Accordingly, the particular arrangements of the return to neutral mechanism, dampening mechanism, brake mechanism, etc. disclosed are meant to be illustrative only and not limiting as to the scope of the invention which is to be given the full breadth of the appended claims and any equivalents thereof.

What is claimed is:

1. A control system for a vehicle comprising:

a drive device mounted on the vehicle and comprising a hydrostatic transmission mounted in a housing;

a control arm mounted on the housing for controlling the output of the hydrostatic transmission between a neutral position and a plurality of forward and reverse positions;

a return arm mounted on the housing and associated with the control arm for returning the control arm towards the neutral position from any of the forward or reverse positions;

a brake for the hydrostatic transmission, where the brake is mounted on the housing and has a brake actuation arm associated therewith;

a brake pedal control arm mounted on the vehicle and engaged to a brake pedal;

a first linkage having a first end connected to the brake pedal control arm and a second end connected to the return arm; and a second linkage having a first end connected to the brake pedal control arm and a second end connected to the brake actuation arm.

2. The vehicle of claim 1, further comprising a slot formed in the brake pedal control arm, and the first end of the second linkage comprises an attachment portion mounted in the slot.

3. The vehicle of claim 1, wherein the second linkage is supported in a bracket attached to the housing.

4. The vehicle of claim 1, wherein rotation of the brake pedal causes the first linkage to engage the return arm to move the control arm to a predetermined position.

5. The vehicle of claim 4, wherein further rotation of the brake pedal causes the second linkage to engage the brake.

6. The vehicle of claim 1, wherein the first linkage further comprises a first spring.

7. The vehicle of claim 6, wherein the second linkage further comprises a second spring.

8. The vehicle of claim 1, wherein the drive device comprises an integrated hydrostatic transaxle.

* * * * *